Patented Jan. 26, 1943

2,309,167

UNITED STATES PATENT OFFICE 2,309,167

REFINING ACID ANHYDRIDES

William Charles Cooper, Jr., Jenkintown, Pa., assignor, by mesne assignments, to Allied Chemical & Dye Corporation, a corporation of New York No Drawing. Application April 22, 1940, Serial No. 330,954

10 Claims. (Cl. 260—343)

This invention relates to the purification of dicarboxylic acid anhydrides, particularly phthalic anhydride and maleic anhydride.

Phthalic anhydride produced by catalytic vapor phase air oxidation of naphthalene and other organic compounds is contaminated with various impurities. In the past it has been proposed to purify such phthalic anhydride physically by distillation or by sublimation, in which case some color-forming impurities remain, or chemically by a heat treatment alone or with condensing agents such as sulfuric acid, oleum, and other acidic substances. If the heat-treatment without a condensing agent is employed, a long heating period is required and even then odorous and color-forming impurities are not adequately removed. The product moreover tends to become colored or to darken with age. The chemical methods apparently owe their effectiveness to an ability to destroy the impurities originally present in the phthalic anhydride, such as volatile quinonic impurities; at the same time, however, they introduce other impurities. By distilling or subliming the heat-treated phthalic anhydride, the impurities possessing or producing color may be partially eliminated. Other impurities introduced by acid-treatment are not eliminated by such distillation or sublimation. Moreover, these impurities have a deleterious effect upon the color stability of the anhydride products, and alter the chemical characteristics of the products so that when employed in resin manufacture, they yield irregular and annoyingly unpredictable results.

Maleic anhydride produced by catalytic vapor phase air oxidation of benzene and other organic compounds also is contaminated with impurities. It has been proposed to subject the crude maleic anhydride to a heat-treatment for a number of hours to convert volatile impurities to less volatile products and then to distill off relatively pure anhydride product from the less volatile products. Although this procedure is not subject to the disadvantage of introducing chemically active or activating impurities into the final product, the method is disadvantageous in that the product has only fair color stability.

In accordance with the present invention I have found that maleic anhydride and phthalic anhydride may be purified by treatment with an acidic condensing agent and subsequent treatment with an alkaline reagent to produce products of superior quality.

By my process maleic and phthalic anhydrides may be produced not only in substantially colorless condition but at the same time free from impurities affecting the nature or rate of reaction of the anhydrides in the manufacture of resins.

The products of the present invention are also unusually satisfactory for manufacture of esters in that in addition to freedom from reactive and color-forming, and possibly catalytic, impurities they are relatively free from disagreeable odor, and the ester products producible therefrom are likewise of good odor.

While it was to be expected, in view of the large proportion of phthalic or maleic anhydride and minute proportions of acidic impurities present, that small quantities of alkaline reagents would react with the anhydride rather than with the acidic impurities, I have found that by proper control of the temperature during the alkaline treatment the alkaline reagent may be caused to react preferentially with the acidic impurities so as to fix them in a relatively non-volatile form. By a subsequent distillation of the phthalic or maleic anhydride the refined anhydride may be obtained as distillate while the various impurities contributing undesirable properties to the product are retained as distillation residue.

For the acid-treatment step of my purification process, I have found acidic condensing agents, such as 66° Bé. sulfuric acid, 60% oleum, stannic chloride, and sulfur trioxide, to be suitable.

The amount of acidic reagent required is normally between 0.1% and 5% by weight of the crude anhydride.

I have found temperatures between 250° and 300° C. to be particularly suitable for the acid-treatment in the purification of phthalic anhydride, whereas temperatures between 100° and 150° C. are quite satisfactory for the acid-treatment of maleic anhydride.

For the alkaline treatment I have found weakly alkaline reagents, e. g., soda ash, sodium bicarbonate, barium hydroxide, or borax, to be particularly satisfactory and these are my preferred alkaline reagents. Other alkaline-reacting materials, such as caustic alkalies, quicklime, zinc oxide, and alumina may be used but to less advantage than the first-mentioned materials. Caustic alkalies are less desirable than the preferred alkaline reagents since the caustic alkalies tend to react with the organic anhydride and thus reduce the yield of desired product.

A mild alkaline treatment, that is, a treatment with sufficiently low concentration of reagent and temperature of reaction to avoid "charring" or substantial attack upon the anhydride, is particularly contemplated.

The amount of alkaline reagent required is normally between 0.1% and 5% by weight of the crude anhydride.

In the purification of phthalic anhydride I have found temperatures between 150° and 250° C. to be quite satisfactory for the alkaline treatment. Temperatures substantially above 250° C. should not be employed since at such temperatures the alkaline reagent is reacted upon by the phthalic anhydride. Under such circumstances charring of the phathalic anhydride occurs with the formation of apparently quinone-like bodies which are detrimental to the color of the finished product and loss of phthalic anhydride is occasioned by the interaction of phthalic anhydride and the alkaline reagent. In the purification of maleic anhydride temperatures between 100° and 150° C. may be used for the alkaline treatment as well as for the acid-treatment. It is desirable to avoid temperatures above 150° C. for both the acidic and alkaline treatments of maleic anhydride since at higher temperatures I have found that the anhydride tends to form condensation, polymerization, or other types of reaction products which adversely affect the yield and quality of the anhydride product.

The anhydride being purified may be subjected to a distillation not only after the alkaline treatment but also between the acid-treatment and the alkaline treatment. This step is advantageous in that it provides a higher degree of purification and reduces the quantity of alkaline reagent required. Moreover, the distillation residue obtained in each of the distillations is more easily handled than that obtained when only one distillation is employed. The intermediate distillation, of course, requires additional heating and distillation capacity and it frequently is preferable to accept the slightly lower purity obtainable with one distillation than to expend the heat and still time required for two distillations.

The time required for the purification treatment usually varies inversely with the temperature employed. For the higher treatment temperatures mentioned above treatment periods of about ¼ to 1 hour are satisfactory for the acid-treatments. At the lower temperatures the treatment periods may be extended for an additional hour or two. The alkaline treatments may be conducted for periods varying from ¼ hour up to 2 or 3 hours. The treatment periods given are representative for operations with agitating equipment of ordinary efficiency. Shorter periods may be employed with highly effective agitators. Longer periods do no harm.

The following examples illustrate the purification process of the invention.

Example 1

A phthalic acid product, obtained by catalytic vapor phase air oxidation of naphthalene and condensation from the product gases by direct contact of the gases with a phthalic acid slurry, was thermally dehydrated and distilled to provide a semi-refined phthalic anhydride. The semi-refined product was heated to a temperature of about 280° C. at ordinary atmospheric pressure (760 mm. of mercury). To the hot molten phthalic anhydride distillate ¼% of its weight of 66° Bé. (98%) sulfuric acid was added during agitation of the mass. After addition of the sulfuric acid, agitation at a temperature of about 280° C. was continued for about 1 hour at atmospheric pressure. The temperature of the batch was then allowed to fall to about 200° C. and while agitation was continued, ¼% by weight of soda ash was added to the molten anhydride. Agitation was continued for an additional hour at approximately the same temperature and pressure. The phthalic anhydride was then subjected to fractional distillation at an absolute pressure of about 75 mm. of mercury.

A first fraction, amounting to about 5% of the charge, was separately collected and a distillation residue amounting to about 15% of the charge was allowed to remain in the still. The balance of the charge, amounting to about 80% thereof, was collected as the purified phthalic anhydride.

The first fraction and the residue consist of phthalic anhydride and more volatile and less volatile impurities and may be separately distilled or otherwise processed to recover their phthalic anhydride contents. For instance, it is feasible to distill each of these products to obtain phthalic anhydride containing a substantial quantity of impurities and to add such phthalic anhydride to the next batch of semi-refined anhydride or crude anhydride to be processed.

The refined phthalic anhydride product in molten condition has a color of about 0 by the Platinum-Cobalt (Hazen) Color standards; it may be reacted with glycerin to form light-colored resins.

Example 2

A light-yellow maleic anhydride produced by dehydration of maleic acid and having a melting point of approximately 52° C., is melted, freed from contained moisture and then heated to about 150° C. at ordinary atmospheric pressure. An amount of 66° Bé. sulfuric acid equal to ¼% of the weight of maleic anhydride is then added and the batch is agitated for about 1 hour. Soda ash, amounting to about ¼% by weight of the batch, is then added and agitation continued for another hour. By fractional distillation at ordinary atmospheric pressure, a water-white distillate of a melting point of 52.6 to 53.0° C. is obtained.

It will be understood that the term "distillation" as used in the appended claims includes vaporization from solid as well as from liquid phase.

I claim:

1. The method of refining a dicarboxylic acid anhydride, which comprises subjecting the anhydride in molten phase to an acid-treatment, subjecting the acid-treated anhydride in molten phase to a mild alkaline treatment, and separating the anhydride from less volatile reaction products by vaporization.

2. The method of refining a crude dicarboxylic acid anhydride, which comprises distilling the crude anhydride to provide a semi-refined anhydride product, subjecting the semi-refined product in molten phase to an acid-treatment, distilling off dicarboxylic anhydride from less volatile reaction products of the acid-treatment, subjecting the acid-treated anhydride distillate in molten phase to a mild alkaline treatment, and subsequently separating the anhydride from less volatile reaction products by distillation.

3. The method of refining phthalic anhydride, which comprises subjecting the anhydride in molten phase to an acid-treatment at a temperature between 250° and 300° C., subsequently subjecting the acid-treated anhydride to treatment with a weakly alkaline reagent at a temperature between 150° and 250° C., and thereafter separating the refined phthalic anhydride from less volatile reaction products by vaporization.

4. The method of refining phthalic anhydride, which comprises treating molten phthalic anhydride with a small proportion of concentrated sulfuric acid at a temperature between 250° and 300° C., cooling the anhydride to a temperature between 150° and 250° C., adding a small proportion of an alkali-metal carbonate to the thus cooled molten anhydride, and thereafter distilling phthalic anhydride from less volatile products produced by the sulfuric acid and alkali-metal carbonate treatments.

5. The method of refining phthalic anhydride, which comprises treating molten phthalic anhydride at a temperature between 250° and 300° C. with a small proportion of concentrated sulfuric acid, distilling off phthalic anhydride from less volatile reaction products of the acid-treatment, treating the phthalic anhydride distillate at a temperature between 150° and 250° C. with a small proportion of alkali-metal carbonate, and distilling off phthalic anhydride from less volatile products of the carbonate treatment.

6. The method of refining crude phthalic anhydride, which comprises subjecting the crude anhydride to distillation to form a semi-refined phthalic anhydride product, treating the semi-refined product in molten phase with between 0.1% and 5% by weight of concentrated sulfuric acid at a temperature between 250° and 300° C., cooling the anhydride to a temperature between 150° and 250° C., adding between 0.1% and 5% by weight of an alkali-metal carbonate to the thus cooled molten anhydride, and thereafter distilling phthalic anhydride from less volatile products produced by the sulfuric acid and alkali-metal carbonate treatments.

7. The method of refining crude phthalic anhydride, which comprises subjecting the crude anhydride to distillation to form a semi-refined phthalic anhydride product, treating the semi-refined product in molten phase at a temperature between 250° and 300° C. with between 0.1% and 5% by weight of concentrated sulfuric acid, distilling off phthalic anhydride from less volatile reaction products of the acid-treatment, treating the phthalic anhydride distillate at a temperature between 150° and 250° C. with between 0.1% and 5% by weight of an alkali-metal carbonate, and distilling off phthalic anhydride from less volatile products of the carbonate treatment.

8. The method of refining maleic anhydride, which comprises subjecting the anhydride in molten phase to an acid-treatment at a temperature between 100° C. and 150° C., subjecting the acid-treated anhydride in molten phase to treatment with a weakly alkaline reagent at a temperature between 100° C. and 150° C., and separating the maleic anhydride from less volatile reaction products by vaporization.

9. The method of refining maleic anhydride, which comprises treating molten maleic anhydride at a temperature between 100° C. and 150° C. with a small proportion of concentrated sulfuric acid, adding a small proportion of alkali-metal carbonate to the molten maleic anhydride while the anhydride is at a temperature between 100° C. and 150° C., and thereafter distilling off maleic anhydride from less volatile products of the sulfuric acid and alkali-metal carbonate treatments.

10. The method of refining maleic anhydride, which comprises treating molten maleic anhydride at a temperature between 100° C. and 150° C. with between 0.1% and 5% by weight of concentrated sulfuric acid, adding between 0.1% and 5% by weight of an alkali-metal carbonate to the molten maleic anhydride while the anhydride is at a temperature between 100° C. and 150° C., and thereafter distilling off maleic anhydride from less volatile products of the sulfuric acid and alkali-metal carbonate treatments.

WILLIAM CHARLES COOPER, Jr.